(12) United States Patent
Honold et al.

(10) Patent No.: US 8,226,117 B2
(45) Date of Patent: Jul. 24, 2012

(54) GAS FLOW DISTRIBUTOR FOR AN AIRBAG MODULE

(75) Inventors: Richard Honold, Blaustein (DE); Ralf Gutmann, Ulm (DE); Reiner Jonas, Leinfelden-Echterdingen (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 12/155,113

(22) Filed: May 29, 2008

(65) Prior Publication Data

US 2009/0001699 A1    Jan. 1, 2009

Related U.S. Application Data

(63) Continuation of application No. PCT/EP2006/011522, filed on Nov. 28, 2006.

(30) Foreign Application Priority Data

Dec. 1, 2005 (DE) .................... 20 2005 019 013 U

(51) Int. Cl.
*B60R 21/261* (2011.01)
*B60R 21/217* (2011.01)
*B60R 21/2346* (2011.01)

(52) U.S. Cl. ................................ 280/740; 280/728.2

(58) Field of Classification Search ............... 280/728.2, 280/740, 730.2
See application file for complete search history.

(56) References Cited

U.S. PATENT DOCUMENTS

| 4,332,398 | A | | 6/1982 | Smith |
| 5,172,933 | A | * | 12/1992 | Strasser ................. 280/740 |
| 5,340,147 | A | * | 8/1994 | Fontecchio et al. ......... 280/728.2 |
| 5,857,696 | A | * | 1/1999 | Inoue et al. ............... 280/728.2 |
| 5,918,898 | A | * | 7/1999 | Wallner et al. ............. 280/728.2 |
| 6,082,761 | A | * | 7/2000 | Kato et al. ................ 280/730.2 |
| 6,152,484 | A | | 11/2000 | Fischer et al. |
| 6,176,517 | B1 | | 1/2001 | Hamilton et al. |
| 6,279,944 | B1 | | 8/2001 | Wipasuramonton et al. |
| 6,293,581 | B1 | | 9/2001 | Saita et al. |
| 6,371,509 | B1 | | 4/2002 | Ellerbrok et al. |
| 6,419,266 | B1 | | 7/2002 | Morfouace et al. |
| 6,450,527 | B2 | | 9/2002 | Kobayashi et al. |
| 6,616,177 | B2 | | 9/2003 | Thomas et al. |

(Continued)

FOREIGN PATENT DOCUMENTS

DE    298 01 104 U1    7/1998

(Continued)

OTHER PUBLICATIONS

Research Disclosure, Fabric diffuser panel for air bag module, Mason Publications, Hampshire, GB, vol. 440, No. 115, Dec. 2000 (XP007127300; ISSN: 0374-4353).

*Primary Examiner* — Eric Culbreth
*Assistant Examiner* — Barry Gooden, Jr.
(74) *Attorney, Agent, or Firm* — Foley & Lardner LLP

(57) ABSTRACT

A gas flow distributor for an airbag module distributing a gas flow generated by a gas generator to inflate an airbag, including fastening structures for fastening the gas flow distributor to a gas generator, the gas flow distributor being formed in the shape of a sleeve from a flexible material, wherein the fastening structures include at least one fastening tab that is formed at one end of the gas flow distributor and via which the gas flow distributor can be fastened to the gas generator.

24 Claims, 17 Drawing Sheets

U.S. PATENT DOCUMENTS

| | | | | |
|---|---|---|---|---|
| 6,783,148 | B2 * | 8/2004 | Henderson | 280/728.2 |
| 6,802,529 | B2 | 10/2004 | Takedomi et al. | |
| 6,808,203 | B2 | 10/2004 | Takahara | |
| 6,860,506 | B2 | 3/2005 | Ogata et al. | |
| 6,877,771 | B2 | 4/2005 | Weber | |
| 6,945,556 | B2 * | 9/2005 | Maertens | 280/729 |
| 6,962,364 | B2 * | 11/2005 | Ju et al. | 280/730.2 |
| 7,040,652 | B2 * | 5/2006 | Ogata et al. | 280/730.2 |
| 7,125,038 | B2 * | 10/2006 | Gammill | 280/728.2 |
| 7,213,839 | B2 * | 5/2007 | Lockwood | 280/743.2 |
| 7,597,348 | B2 * | 10/2009 | Fukuda et al. | 280/730.2 |
| 7,597,351 | B2 * | 10/2009 | Kashiwagi | 280/740 |
| 7,600,778 | B2 | 10/2009 | Schang et al. | |
| 7,819,424 | B2 * | 10/2010 | Toda et al. | 280/730.2 |
| 7,938,436 | B2 * | 5/2011 | Lunt et al. | 280/728.2 |
| 2002/0105174 | A1 | 8/2002 | Tanase et al. | |
| 2003/0090093 | A1 * | 5/2003 | Ikeda et al. | 280/730.2 |
| 2003/0094798 | A1 * | 5/2003 | Ogata et al. | 280/730.2 |
| 2003/0132615 | A1 * | 7/2003 | Henderson | 280/728.3 |
| 2003/0141710 | A1 | 7/2003 | Zahn et al. | |
| 2003/0197357 | A1 | 10/2003 | Heigl et al. | |
| 2003/0230878 | A1 * | 12/2003 | Inoue | 280/730.2 |
| 2004/0075257 | A1 * | 4/2004 | Ogawa et al. | 280/730.2 |
| 2004/0100077 | A1 * | 5/2004 | Ogata | 280/730.2 |
| 2004/0104561 | A1 * | 6/2004 | Maertens | 280/730.2 |
| 2004/0104563 | A1 | 6/2004 | Fischer | |
| 2004/0188987 | A1 | 9/2004 | Salmo et al. | |
| 2005/0029784 | A1 | 2/2005 | Siegel et al. | |
| 2005/0062262 | A1 * | 3/2005 | Williams | 280/728.2 |
| 2005/0121884 | A1 | 6/2005 | Ogata et al. | |
| 2005/0134021 | A1 * | 6/2005 | Acker et al. | 280/728.2 |
| 2005/0248132 | A1 * | 11/2005 | Wheelwright | 280/729 |
| 2006/0108778 | A1 * | 5/2006 | Ochiai et al. | 280/730.2 |
| 2006/0197327 | A1 * | 9/2006 | Maripudi et al. | 280/740 |

FOREIGN PATENT DOCUMENTS

| | | |
|---|---|---|
| DE | 199 46 413 A1 | 4/2000 |
| DE | 198 50 448 A1 | 5/2000 |
| DE | 200 03 652 U1 | 5/2000 |
| DE | 101 19 198 A1 | 11/2001 |
| DE | 101 38 546 A1 | 3/2002 |
| DE | 202 00 365 U1 | 8/2002 |
| DE | 202 17 892 U1 | 3/2003 |
| DE | 202 16 338 U1 | 4/2003 |
| DE | 202 16 339 U1 | 4/2003 |
| DE | 102 54 453 A1 | 7/2003 |
| DE | 20 2004 011 348 U1 | 1/2005 |
| DE | 20 2004 016 975 U1 | 2/2005 |
| DE | 20 2004 019 183 U1 | 4/2005 |
| EP | 0 855 316 B1 | 7/1998 |
| EP | 1 149 005 | 10/2001 |
| EP | 1 054 790 B1 | 11/2002 |
| EP | 1 310 409 A2 | 5/2003 |
| EP | 1 340 656 A2 | 9/2003 |
| EP | 1 373 029 A1 | 1/2004 |
| EP | 1 418 096 A1 | 5/2004 |
| EP | 1 462 321 A1 | 9/2004 |
| EP | 1 510 418 A1 | 3/2005 |
| JP | 11-170955 | 6/1999 |
| JP | 2000-127887 A | 5/2000 |
| WO | WO-99/42333 | 8/1999 |
| WO | WO 99/42340 | 8/1999 |
| WO | WO 99/59845 | 11/1999 |
| WO | WO 00/20260 | 4/2000 |
| WO | WO 00/32447 | 6/2000 |
| WO | WO 02/081267 A2 | 10/2002 |
| WO | WO-03/010033 A2 | 2/2003 |
| WO | WO 2005/080147 A1 | 9/2005 |
| WO | WO-2005/110820 A1 | 11/2005 |
| WO | WO 2006/048223 A1 | 5/2006 |

* cited by examiner

FIG 2
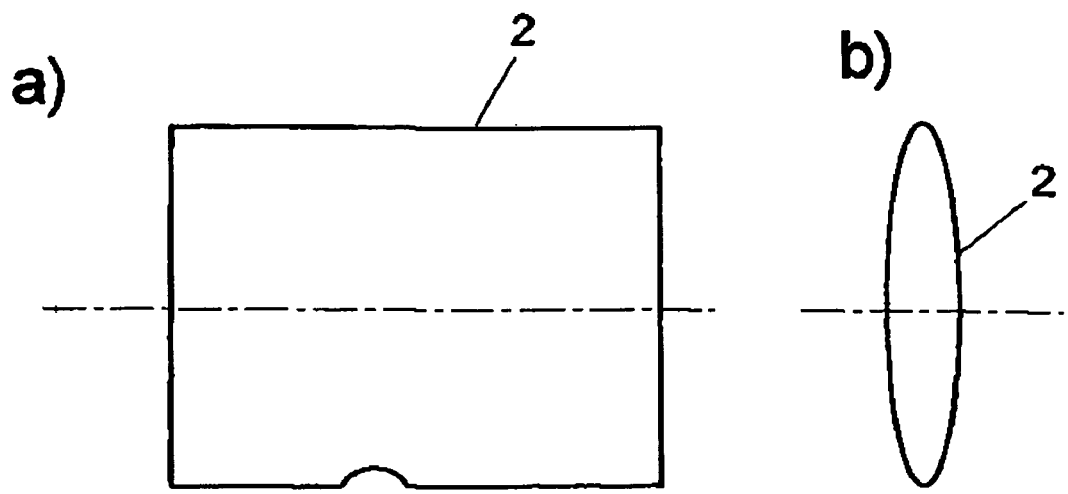
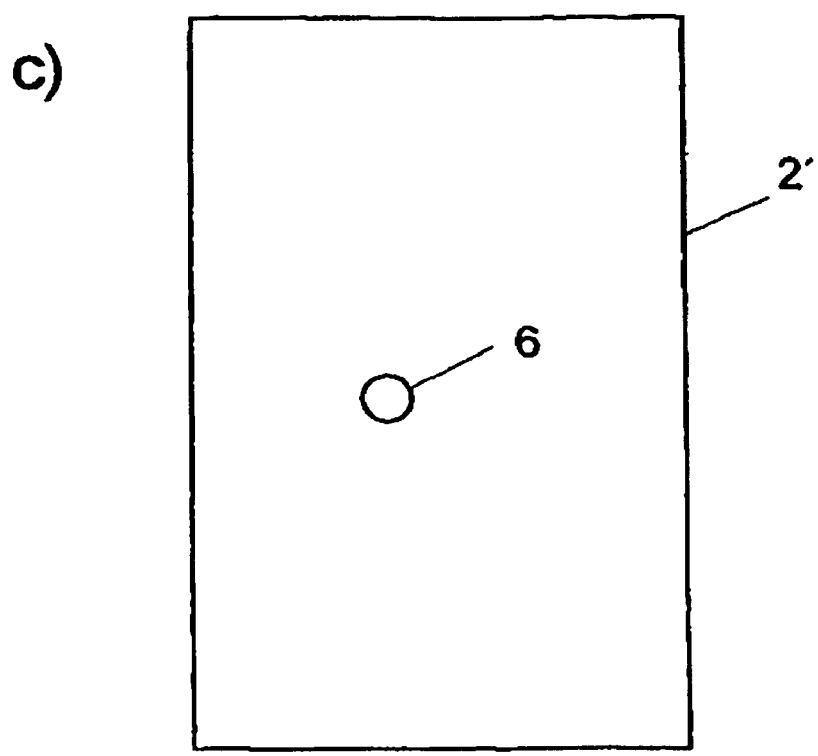

FIG 7
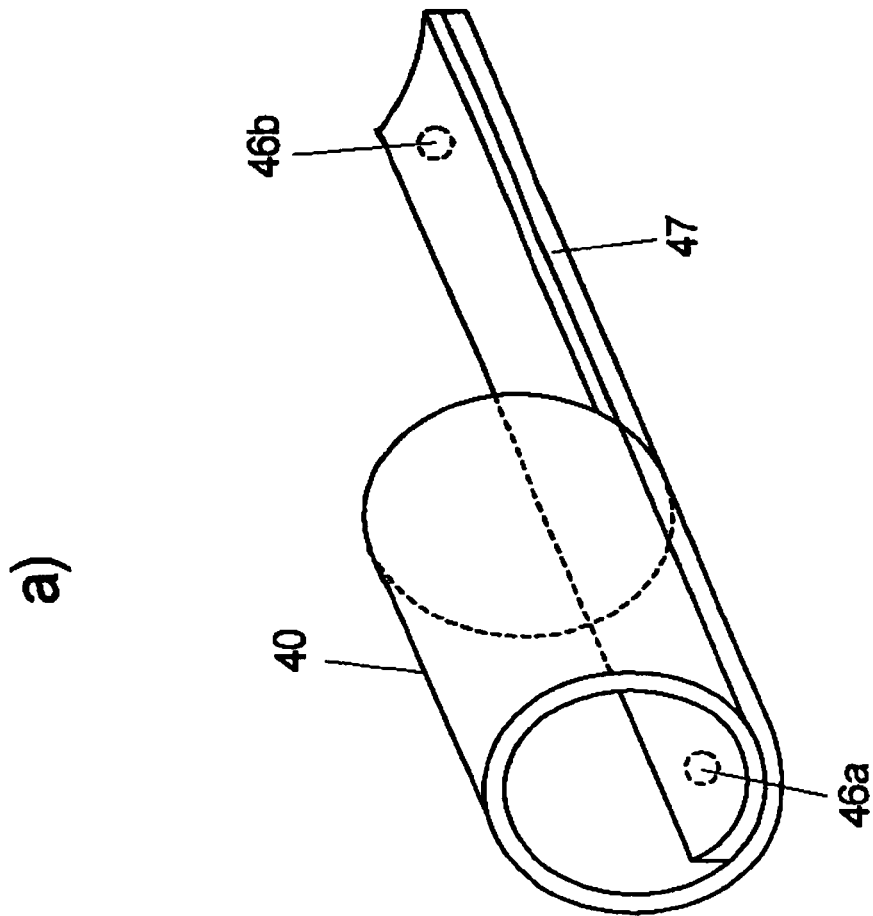
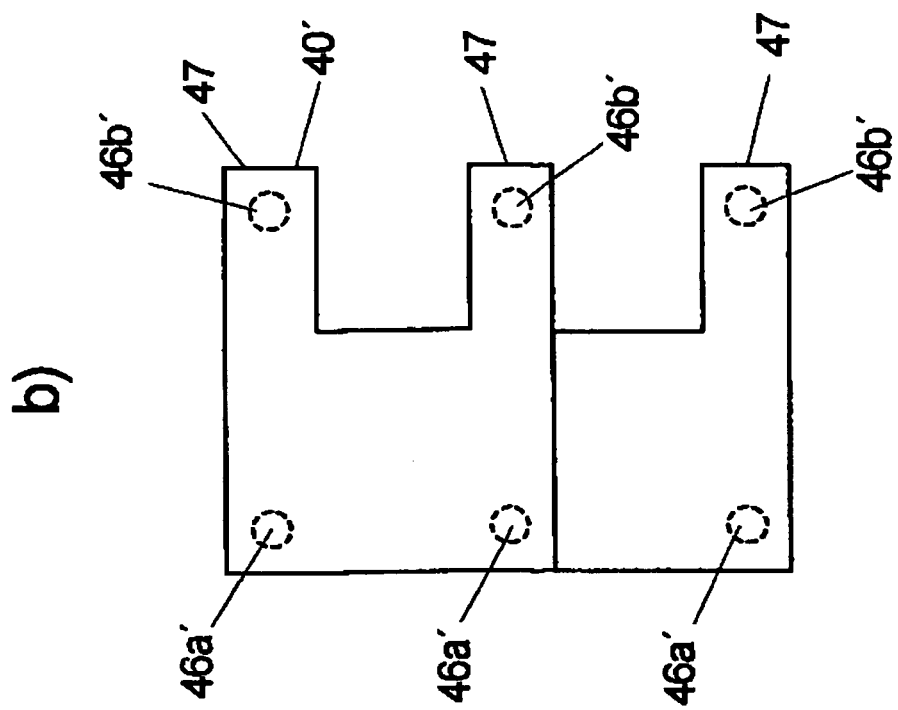

FIG 10
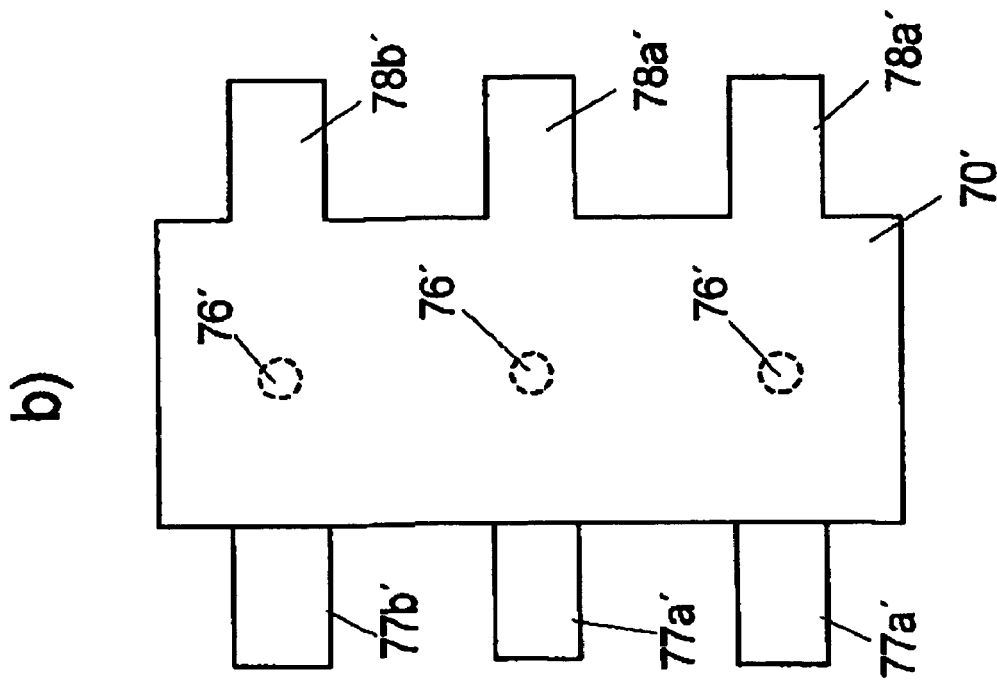
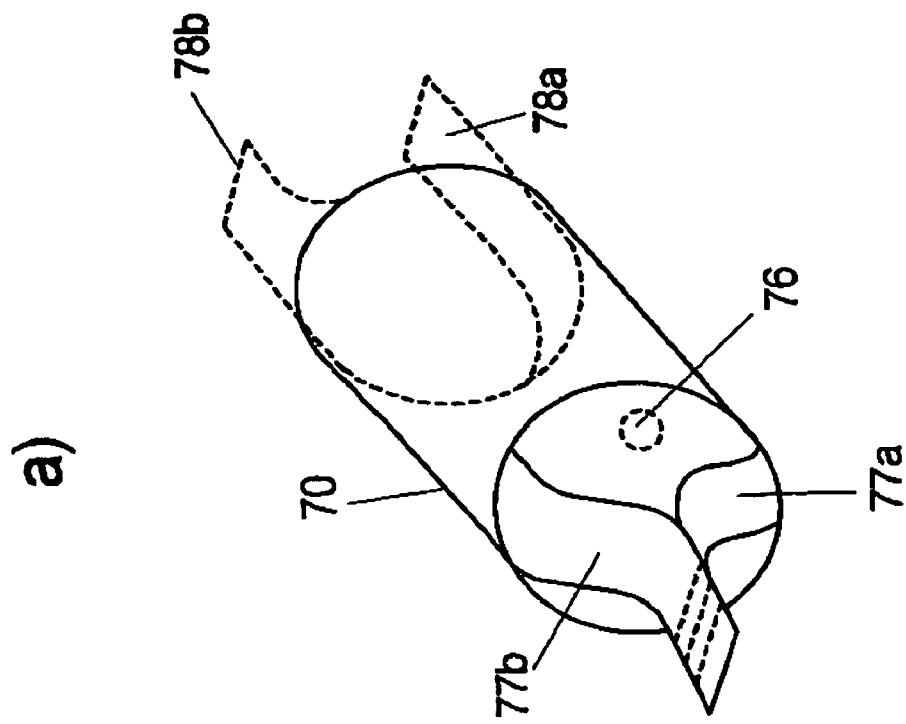

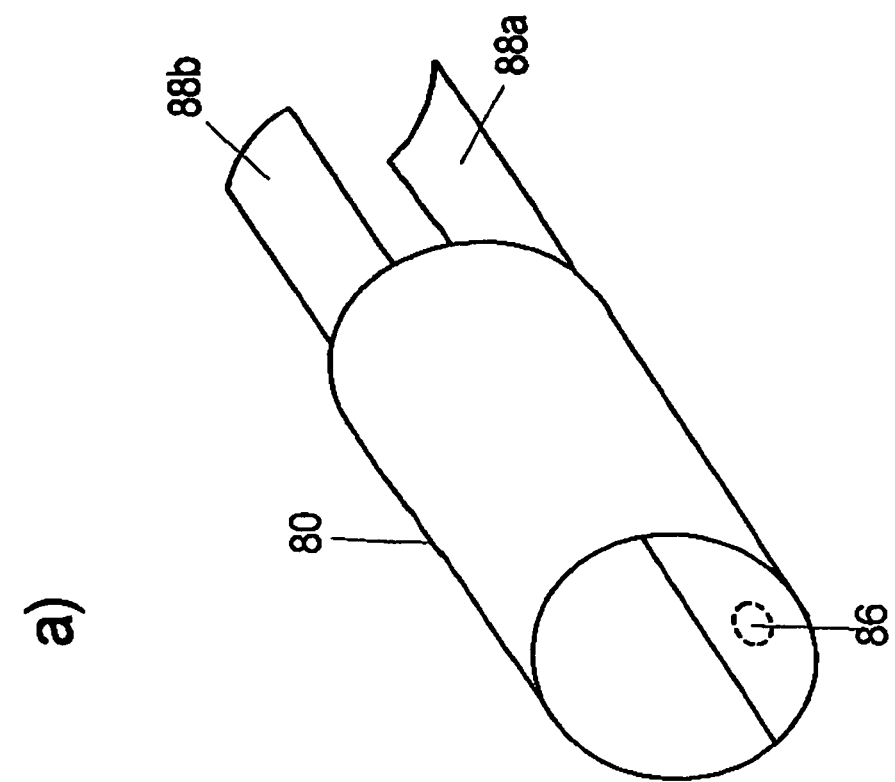

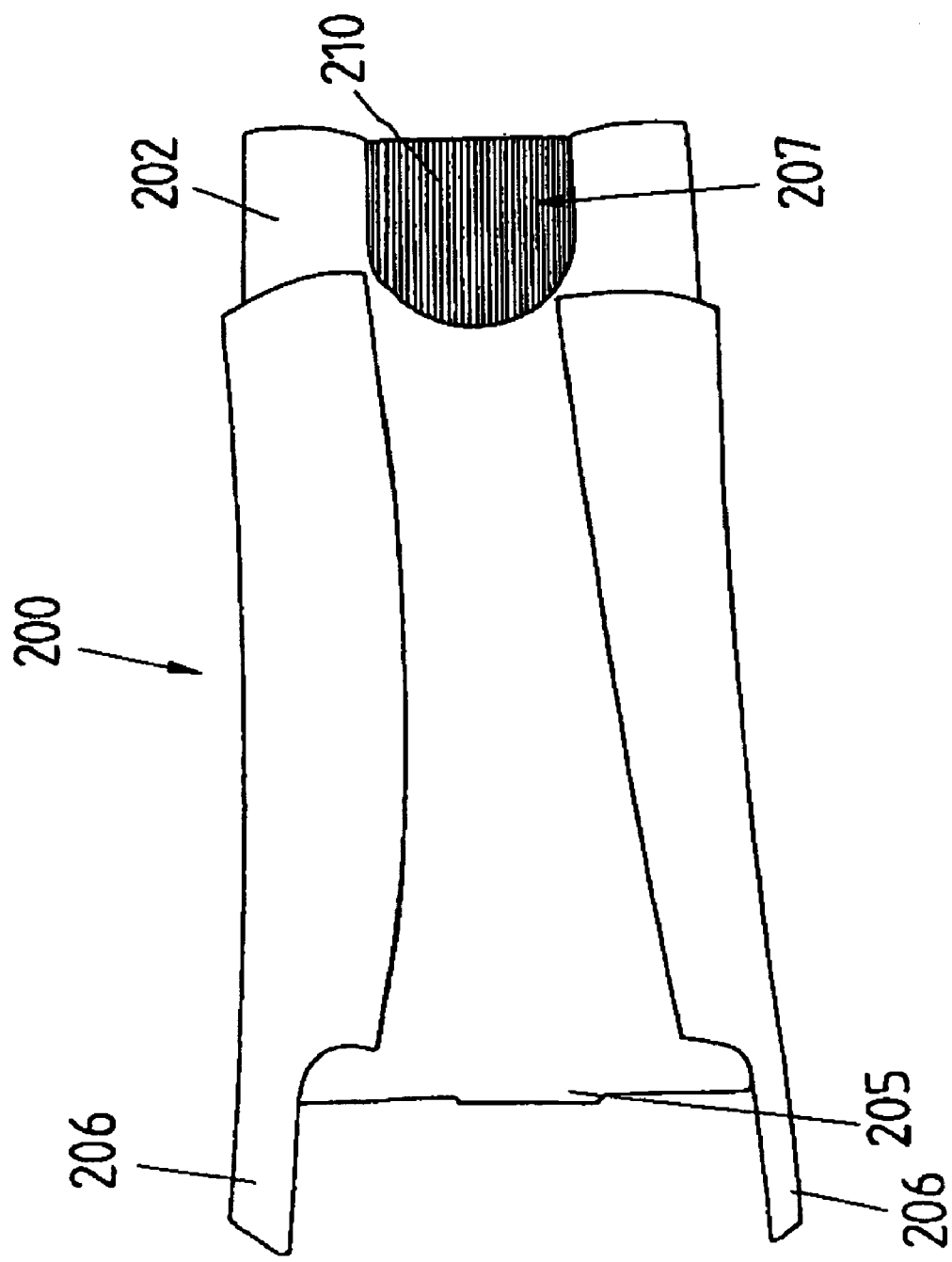

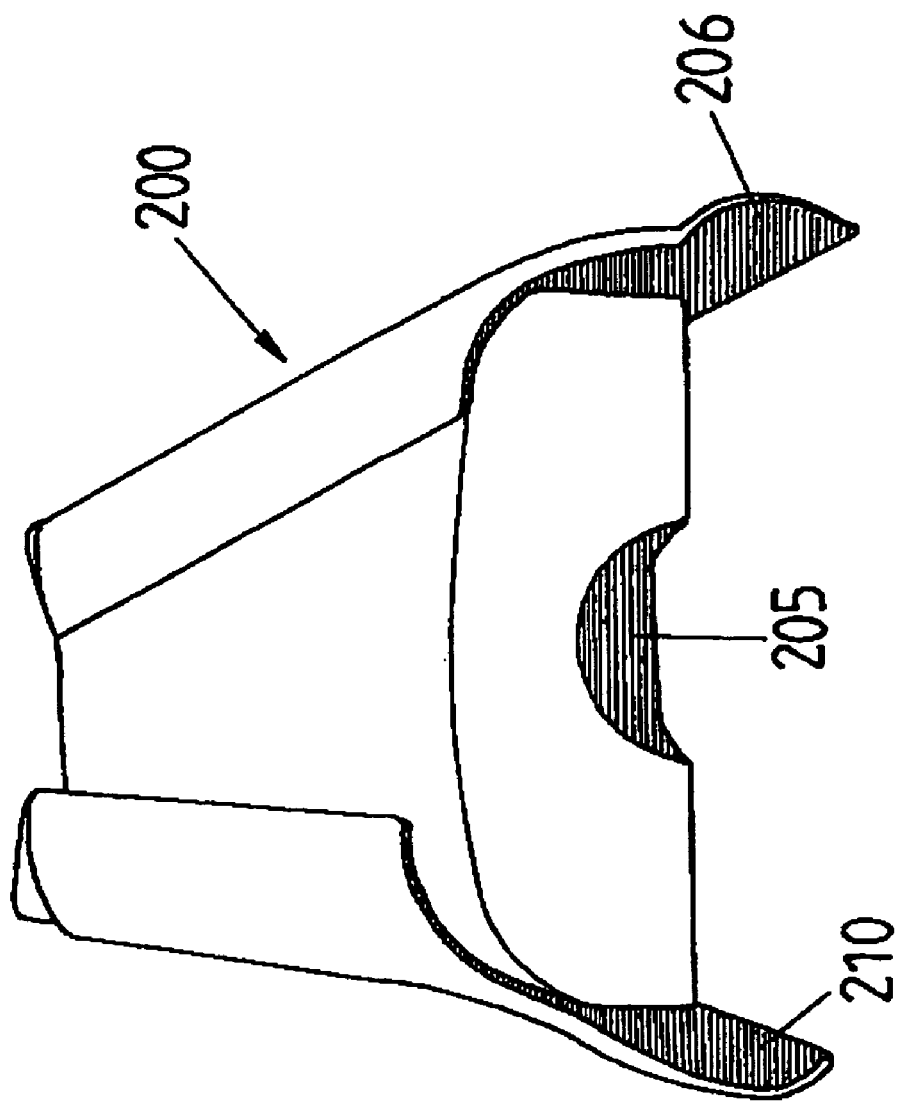

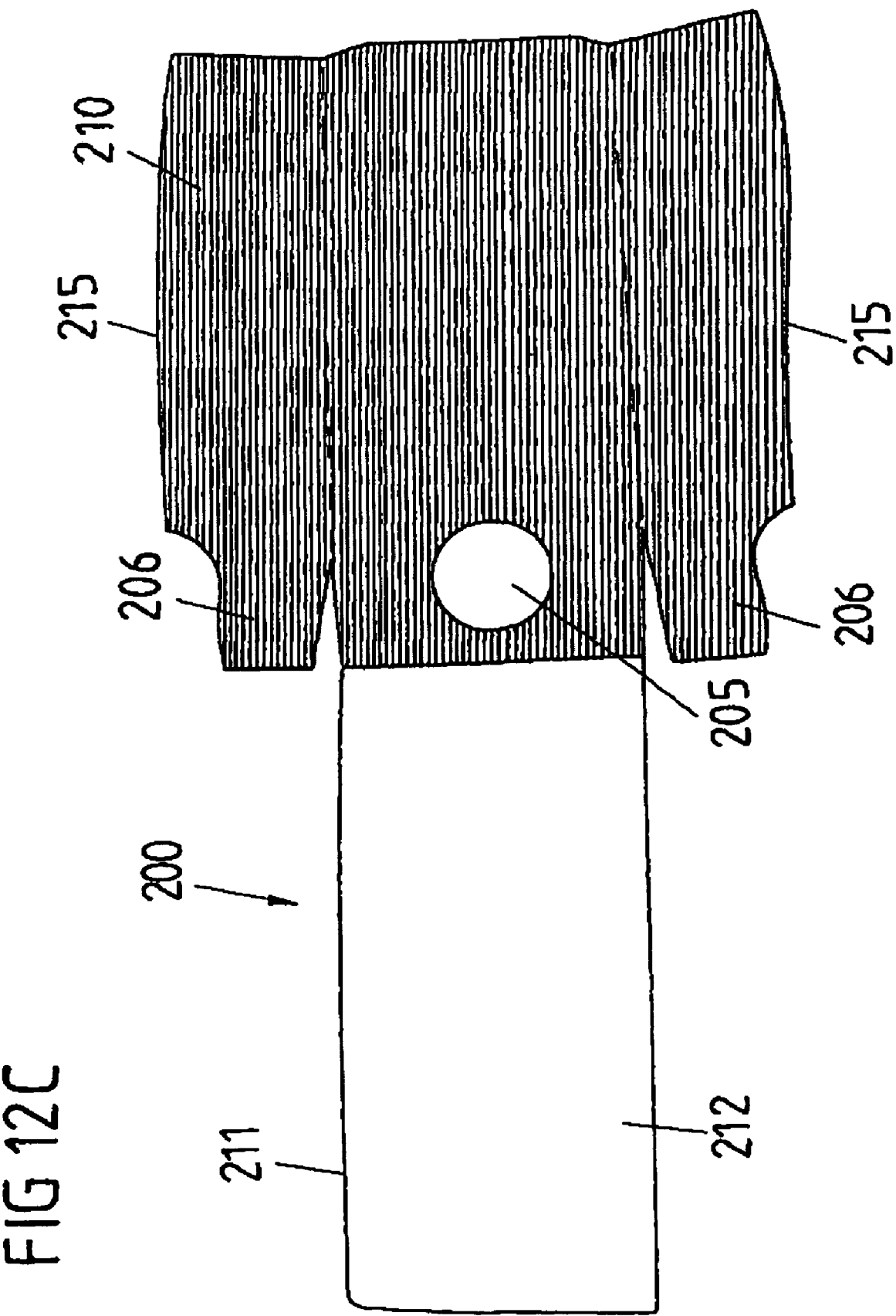

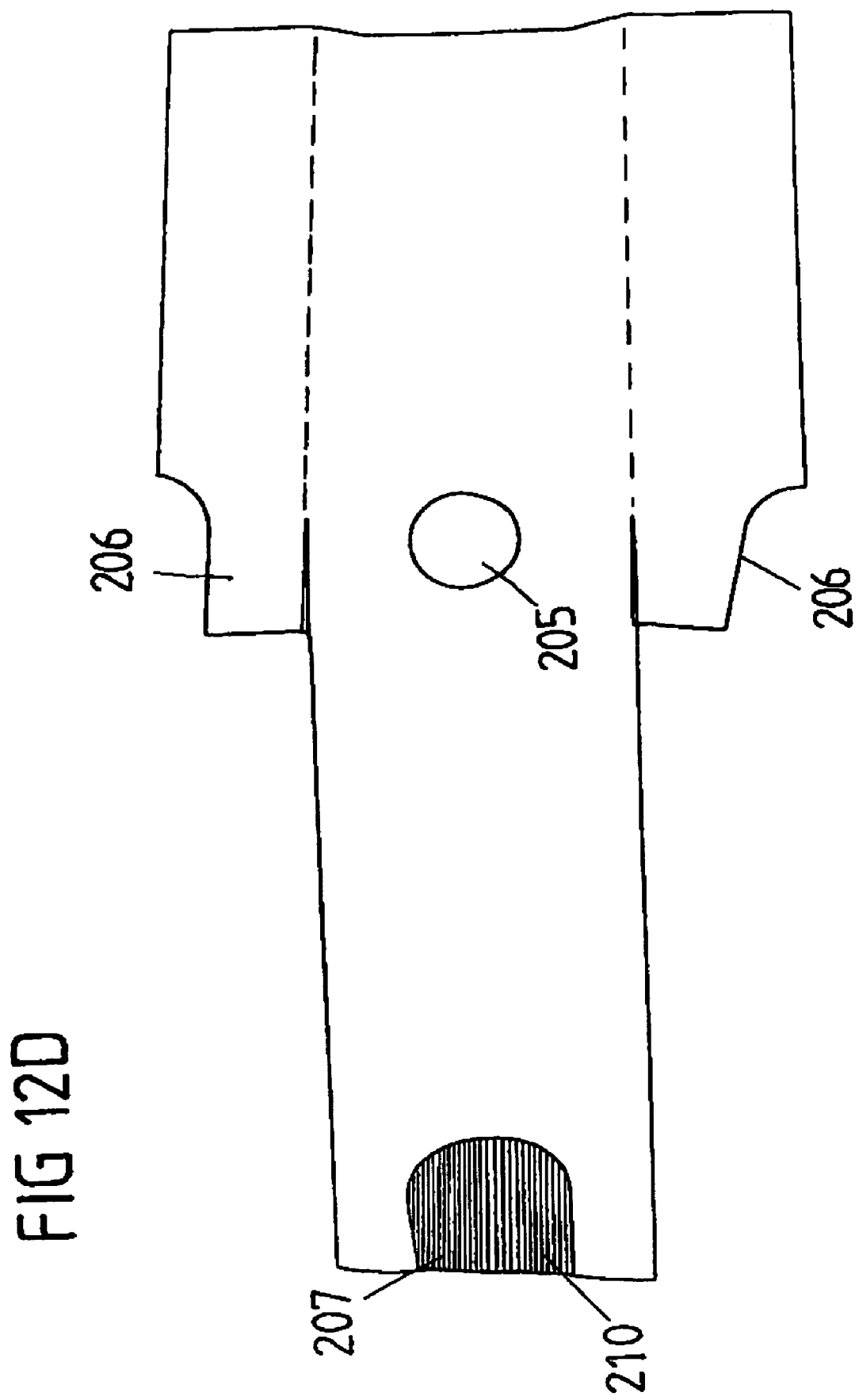

GAS FLOW DISTRIBUTOR FOR AN AIRBAG MODULE

CROSS-REFERENCE TO RELATED PATENT APPLICATIONS

This application is a Continuation of International Application No. PCT/EP2006/011522, filed Nov. 28, 2006, which was published in German as WO 2007/062847 and is incorporated herein by reference in its entirety.

BACKGROUND

The application relates to a gas flow distributor for an airbag module for the distribution of a gas flow generated by a gas generator in order to inflate an airbag.

An airbag module for vehicle restraint systems generally comprises an airbag and a gas generator that may generate gas in order to inflate the airbag when triggered. The flow of the generated gas into the airbag conventionally takes place in as specific a manner as possible to ensure a defined deployment of the airbag and optimum restraint in the event of an accident.

Gas flow distributors for use with gas generators are known. Gas flow distributors are conventionally arranged in the shape of a sleeve around the gas generator to distribute the gas flow to inflate the airbag. Gas flow distributors are arranged in the region of outflow openings of the gas generator such that the gas flowing out is distributed in a specific manner by the gas flow distributor. Conventionally, gas flow distributors in the shape of a sleeve have openings at both ends from which gas generated by the gas generator can flow into an airbag.

SUMMARY

One disclosed embodiment relates to a gas flow distributor for an airbag module. The gas flow distributor distributes a gas flow generated by a gas generator to inflate an airbag. The gas flow distributor includes fastening structures for fastening the gas flow distributor to the gas generator. The gas flow distributor is formed in the shape of a sleeve from a flexible material. The fastening structures include at least one fastening tab that is formed at one end of the gas flow distributor and via which the gas flow distributor can be fastened to the gas generator.

BRIEF DESCRIPTION OF THE DRAWINGS

FIGS. 2a and 2b are side and front views of a gas flow distributor according to an exemplary embodiment.

FIG. 2c shows a blank for a gas flow distributor according to an exemplary embodiment.

FIG. 7a shows an embodiment of a gas flow distributor that is formed from a multi-layered fabric.

FIG. 7b is a schematic view of a blank for a gas flow distributor according to an exemplary embodiment.

FIG. 8a shows a gas flow distributor formed from a multi-layered fabric according to another exemplary embodiment.

FIG. 8b shows a blank for a gas flow distributor according to the embodiment of FIG. 8a.

FIG. 9a shows an exemplary embodiment of a gas flow distributor.

FIG. 9b shows a blank for a gas flow distributor according to the embodiment of FIG. 9a.

FIG. 10a shows an exemplary embodiment of the gas flow distributor after the free ends of two fastening tabs are connected to each other.

FIG. 10b shows a blank for a gas flow distributor according to the embodiment of FIG. 10a.

FIG. 11a shows another exemplary embodiment of the gas flow distributor.

FIG. 11b is a schematic of a blank for a gas flow distributor according to an exemplary embodiment.

FIG. 12a is a perspective view of an exemplary embodiment of the gas flow distributor.

FIG. 12b is a view of the gas flow distributor of FIG. 12a.

FIG. 12c is a perspective view of the inside of an uncoiled gas flow distributor according to an exemplary embodiment.

FIG. 12d is a perspective view of the outside of an uncoiled gas flow distributor according to an exemplary embodiment.

DETAILED DESCRIPTION

Figure 1:
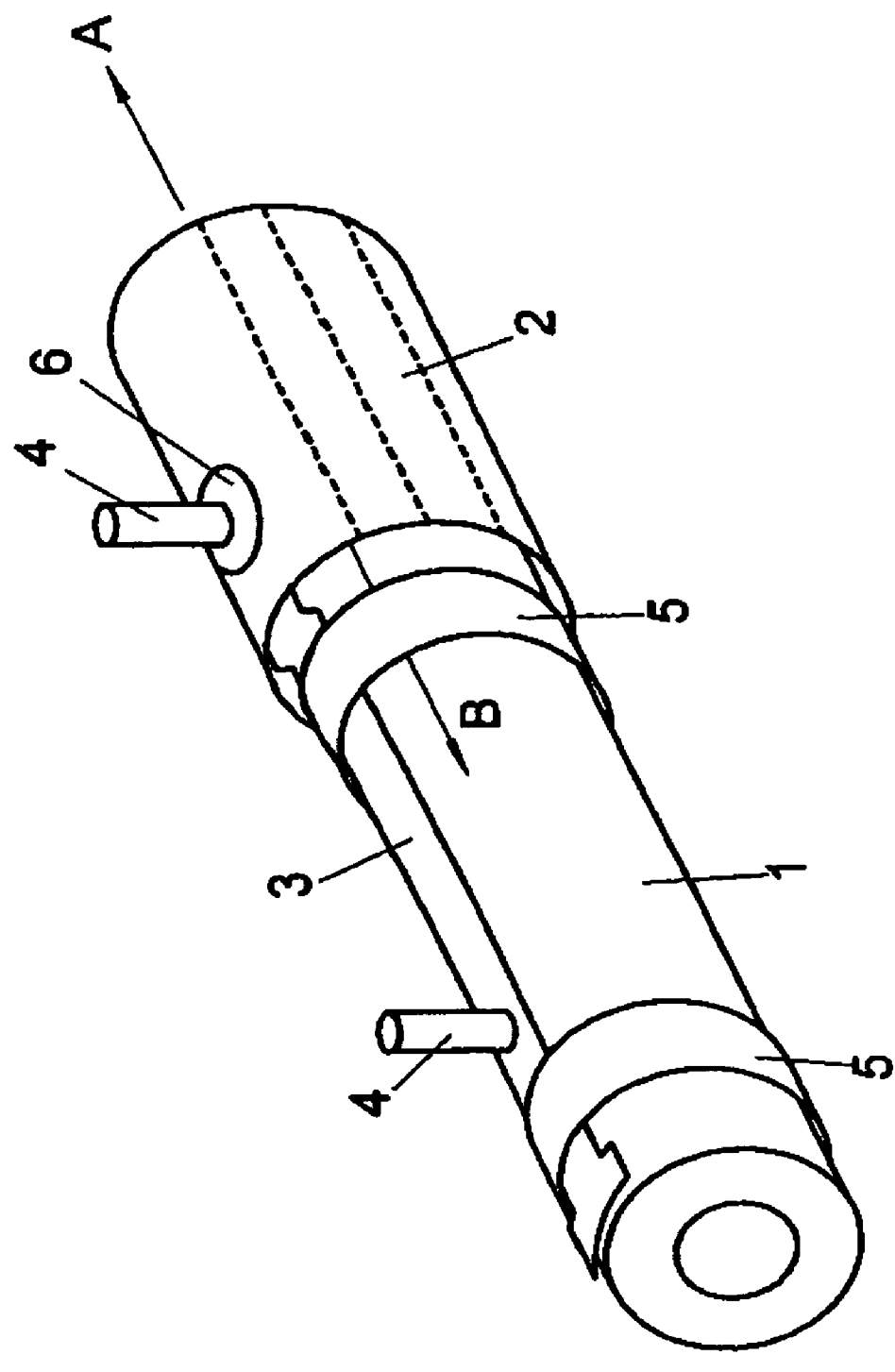
FIG. 1 shows an exemplary embodiment of the gas flow distributor fastened to a gas generator by threaded bolts.

According to one exemplary embodiment, an airbag module includes a gas flow distributor for inflating the airbag. The airbag module for a side airbag may include a tubular gas generator for inflating the airbag as described in WO 02/081267 A2, which is herein incorporated by reference in its entirety. The tubular gas generator is surrounded by a gas flow distributor in the shape of a sleeve. In this case, the gas flow distributor can be formed from metal or a flexible material. The gas flow distributor is arranged in the interior of the airbag and is connected to the inner wall of the airbag.

According to another exemplary embodiment, a gas generator device may include a tubular, inner element for accommodating a pyrotechnic material as described in WO 00/32447, which is herein incorporated by reference in its entirety. When ignited, the pyrotechnic material releases a gas in order to inflate an airbag. The inner element is surrounded by an outer element which is likewise formed in a tubular manner, includes outflow openings and serves to distribute a gas flow which flows out of the inner element.

According to other exemplary embodiments, a gas flow distributor may be easily connected to a gas generator. The gas flow distributor may be provided for distribution of a gas flow generated by a gas generator to inflate an airbag. The gas flow distributor may be in the shape of a sleeve made of flexible construction that includes fastening structures for connection to a gas generator.

A subassembly may be preassembled and include a gas generator and gas flow distributor prior to installation in an airbag module. As a result, the production of the airbag module may be automated to a greater extent and therefore more cost-effective. Furthermore, the presence of special fastening structures may ensure a secure connection between the gas flow distributor and the gas generator, even when the airbag module is triggered.

The fastening structures on the gas flow distributor may also be constructed such that they indirectly connect the gas flow distributor to a gas generator. In this case, the gas generator may be arranged on a holder, a flange or another element of an airbag module. The fastening of the gas flow distributor to the gas generator may take place via the holder or other part of the airbag module.

In an exemplary embodiment, the gas generator or a part which is connected to it may have fastening structures. The fastening structures may be designed such that they correspond to the fastening structures present on the gas flow distributor. As a result, efficient installation of the gas flow distributor and gas generator is possible. The connection between the gas flow distributor and gas generator via the fastening structures may be secure and may be designed to bear a load. For the fastening of the gas flow distributor, no elements formed on the gas generator for other purposes have to be used for producing the connection.

In an exemplary embodiment, the fastening structures may provide a clamping connection. The gas flow distributor may be connected to a gas generator via a clamping connection. The clamping connection makes installation of the gas flow distributor and the gas generator easy.

According to an exemplary embodiment, the fastening structures may be constructed in such a manner that the gas flow distributor may be clamped to a gas generator without engaging the circumference of the gas flow distributor. As a result, a simple and flexible clamping of the gas flow distributor to a gas generator is possible. A gas flow distributor that does not have a hollow-cylindrical shape may be securely clamped to a gas generator with fastening structures of this type.

In a preferred exemplary embodiment, the fastening structures may include at least one opening for the passage of a threaded bolt. The gas flow distributor may be arranged on a gas generator such that a threaded bolt may reach through the opening. As a result, the gas flow distributor may be fixed to the gas generator. In this case, the diameter of the opening may be constructed in such a manner that the threaded bolt is clamped to the opening. This construction enables a stable connection that is simple to realize.

According to an exemplary embodiment, the threaded bolt may be formed directly on the gas generator. The threaded bolt may be integrally connected to the gas generator. The threaded bolt may also be constructed as an additional part of the airbag module. The connection to the gas flow distributor may take place indirectly via the further part of the airbag module that is connected to the gas generator.

According to an exemplary embodiment, the fastening structures may include at least one fastening tab. The gas flow distributor may be connected to a gas generator via the fastening tab. This fastening tab may be formed at one end of the gas flow distributor such that it permits connection to the gas generator in a clamping manner.

According to an exemplary embodiment, the fastening tabs may permit a simple and space-saving connection. The gas flow distributor may be clamped to a cylindrical tubular gas generator via the fastening tabs without having to be clamped with a clip.

In an exemplary embodiment, the gas flow distributor may be designed such that it can be fastened in the center or at one end of a gas generator. In the first embodiment, the gas flow distributor has a fastening tab at each of its ends. In the second embodiment, at least two fastening tabs are arranged at the same end of the gas flow distributor.

According to an exemplary embodiment, openings for receiving a threaded bolt arranged on the gas generator may also be provided in the fastening tabs. The openings in the fastening may permit an additional fixing of the gas flow distributor to a gas generator. The additional fixing may intervene should a fastening tab slip out of the clamp.

According to an exemplary embodiment, the free ends of two fastening tabs at the same end of the gas flow distributor may be connected to each other. The flow away may be controlled via the corresponding end of the gas flow distributor. Additionally, the flow may be divided into one or more gas flows.

According to an exemplary embodiment, the distribution of the gas flow may be controlled by the gas flow distributor. The flow away may be controlled by the latter via the length and diameter thereof. In addition, the flow away from the outflow openings of the gas flow distributor may be controlled via the size and geometry of the fastening tabs.

According to and exemplary embodiment, the gas flow out of an outflow opening may additionally be deflected. The direction may be influenced via the orientation of fastening tabs arranged at the ends of the gas flow distributor. Additionally, the out flowing gas may be divided into further part flows by the connection of two or more fastening tabs.

According to an exemplary embodiment, each end of the gas flow distributor may include at least one outflow opening. One or both ends of the gas flow distributor may be closed, with the gas flow distributor in the latter case having outflow openings at a different location. The outflow openings may be in the center of the gas flow distributor or along a straight line along the length of the gas flow distributor.

According to an exemplary embodiment, the gas flow distributor may be formed from a textile fabric. Additionally, the gas flow distributor may include a plurality of layers of textile fabric arranged in sections. As a result, the gas flow distributor may be reinforced in the region of the fastening structures such that tearing out or degrading of the fastening structures is limited. Furthermore, a plurality of material layers may be arranged on sections of the gas flow distributor. The material layers may be located in the region of outflow openings of the gas generator and may therefore be directly exposed to gas flowing out. The multi-layered structure in these regions may limit damage to the gas flow distributor by out flowing gases.

According to an exemplary embodiment, the gas flow distributor may be formed from a tubular material. In this case, the fastening structures may be produced by cutting the tubular material. In a further embodiment, when a planar, textile fabric is used, the gas flow distributor may be produced from a coiled planar blank. In this case, the fastening structures may be provided directly in the blank. The blank may also be constructed such that multi-layer sections of the gas flow distributor are produced. Additionally, the entire gas flow distributor may be of multi-layered design.

According to an exemplary embodiment, the gas flow distributor may include a coating applied on the inside. The coating may protect the gas flow distributor from hot gases flowing out of the gas generator. The coating may take place by vapor deposition of a metallic material or may be formed from a heat-resistant plastic.

In an exemplary embodiment, an airbag module for a vehicle restraint system is provided. The airbag module includes a gas generator and a gas flow distributor. In this case, the gas flow distributor may surround the gas generator in the region of outflow openings formed in the gas generator. As a result, the gas flowing out of outflow openings of the gas generator may be distributed.

In this case, distribution is also to be understood as meaning that gas flowing out may be predominantly deflected only in one direction. The distribution takes place such that a plurality of part gas flows may be formed. The gas flows that form may be conducted away in different directions. The gas flow generated by the gas generator may be distributed in two opposite directions by the gas flow distributor. The respective gas flows may be directed away via outflow openings arranged in the ends of the gas flow distributor. The gas flow distributor may be connected to the gas generator via a fastening means.

FIG. 1 shows an embodiment of the gas flow distributor. A gas flow distributor 2 connected to a tubular gas generator 1 is illustrated. A fastening strip 3 with threaded bolts 4 is arranged on the tubular gas generator 1 and may be fastened by clamping rings 5 that completely engage around the gas generator 1.

The gas flow distributor 2 has an opening 6 through which a threaded bolt 4 of the fastening rail 3 extends. The threaded bolt 4 fastens the gas flow distributor 2 to the gas generator 1.

The gas flow distributor 2 may be formed from a textile fabric arranged surrounding the gas generator 1 such that it covers a section of the gas generator 1 in which the outflow openings (not illustrated) are located. The gas flow distributor 2 may be of hollow-cylindrical shape surrounding the gas generator 1, with a cross section that is larger than the gas generator 1 and arranged coaxially with respect to the gas generator 1.

According to an exemplary embodiment, the gas generator 1 may be arranged with respect to the gas flow distributor 2. The gas flow distributor 2 may be shaped to be continuously flat in the region of the gas generator 1. The gas flow distributor 2 of FIG. 1 may be arranged with respect to the gas generator 1 at a distance from the outflow openings (not illustrated) such that gas can flow unhindered out of the outflow openings. Additionally, the end of the gas flow distributor that lies opposite the gas generator may be of flat design to prevent overarching that may show, i.e. in the seat.

According to an exemplary embodiment, the gas flow distributor 2 may be designed such that the gas flowing out of the gas generator 1 may be divided in two directions (indicated by the lines A and B). The arrangement in FIG. 1 of a gas flow distributor 2 and gas generator 1 may be arranged in the interior of an airbag (not illustrated) or outside an airbag. The arrangement may also be arranged on an airbag such that a section projects into the airbag, but part of the arrangement is located outside the airbag.

FIG. 2a shows, schematically, a side view of a gas flow distributor 2 that has an opening 6 for receiving a threaded bolt or another fastening means for connection to a gas generator (not illustrated). FIG. 2b shows, schematically, the front view of the gas flow distributor 2 of FIG. 2a. The gas flow distributor 2 includes an elliptical cross section. The shaping is easy to produce, since the gas flow distributor 2 is formed from a flexible material.

In an exemplary embodiment, the gas flow distributor may include a hollow-cylindrical cross section at one end for connection to a tubular gas generator. The opposite end may be shaped to be flat, i.e. as an oval cross section. The flat design of a section of the gas flow distributor limits overarching that would show when fitting the gas flow distributor 2 into a vehicle seat.

FIG. 2c shows the developed illustration of the gas flow distributor 2 of FIG. 2a. The gas flow distributor 2 of FIGS. 2a, 2b may be produced from a rectangular blank 2' of flexible material, with an opening 6 for receiving a threaded bolt being incorporated into the blank 2'.

Figure 3:
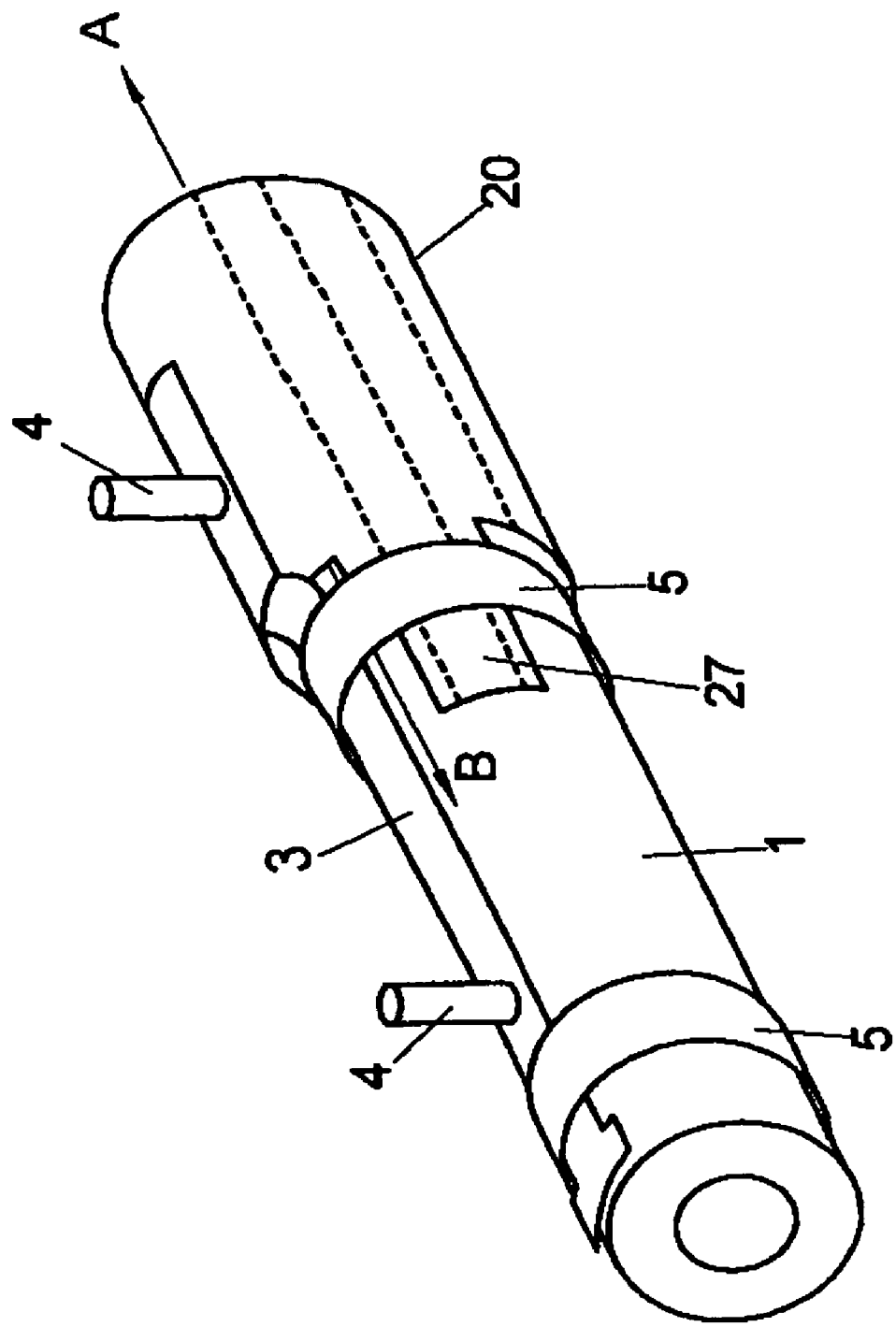
FIG. 3 shows a gas flow distributor clamped to a gas generator by fastening tabs, according to an exemplary embodiment.
Figure 4:
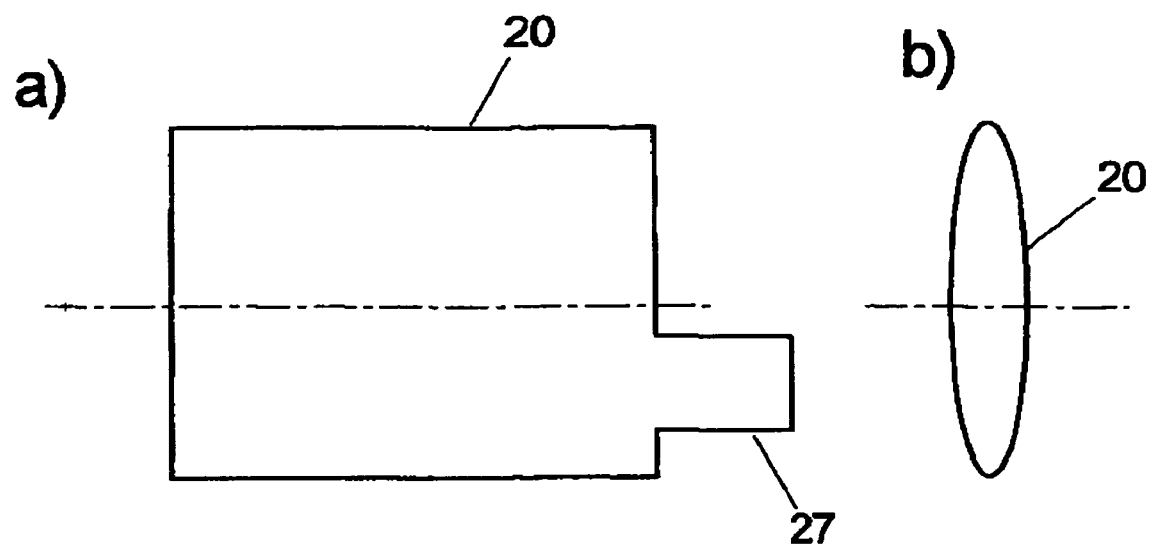
FIGS. 4a and 4b are side and front views of a gas flow distributor according to an exemplary embodiment.
FIG. 4c is a schematic view of a blank for a gas flow distributor according to an exemplary embodiment.

FIGS. 3 and 4 show an embodiment of the gas flow distributor. FIG. 3 shows a tubular gas generator 1 that may be connected to a gas flow distributor 20. A fastening rail 3 may include threaded bolts 4 is connected to the gas generator 1 with two clamping rings 5.

In an alternate embodiment of FIG. 1, the gas flow distributor 20 may include fastening tabs 27 as the fastening structure for connection to a gas generator instead of an opening. In this case, the two fastening tabs 27 are arranged on the gas flow distributor. The fastening tabs 27 are connected to the gas generator 1 via a clamping ring 5, with the clamping ring 5 also serving as the fixing of the fastening rail 3.

In an embodiment of FIG. 1, the gas flow distributor 20 is pushed in some sections over the outflow end of the gas generator 1. As a result, gas emerging through outflow openings (not illustrated) of the gas generator 1 may be divided in two flow-away directions that run approximately parallel to the gas generator 1.

The subassembly of FIG. 3 includes the gas generator and gas flow distributor. The subassembly can be fastened to an airbag, a vehicle seat or part of a vehicle body (not illustrated) via the threaded bolt 4.

FIG. 4a schematically shows a side view of a gas flow distributor 20 with fastening tabs 27. The gas flow distributor 20 includes an elliptical cross section similar to that of FIG. 4b.

Shown in FIG. 4c, the second embodiment of the gas flow distributor according to FIGS. 3 and 4a to 4b may be constructed from a rectangular blank 20' of flexible material. The blank 20' includes fastening tabs 27.

Figure 5:
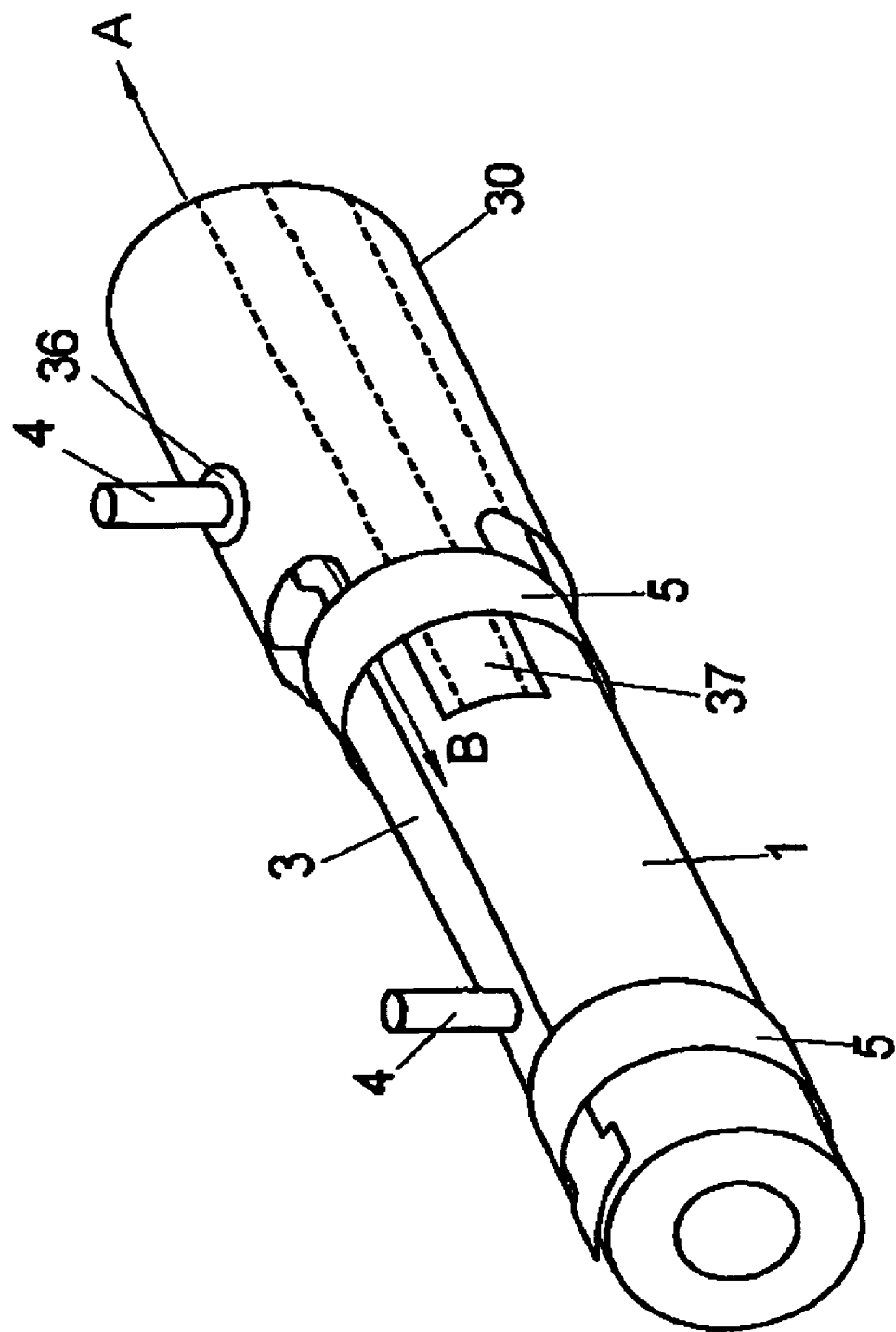
FIG. 5 shows a gas flow distributor connected to a gas generator with fastening tabs and openings for the passage of a threaded bolt, according to an exemplary embodiment.
Figure 6:
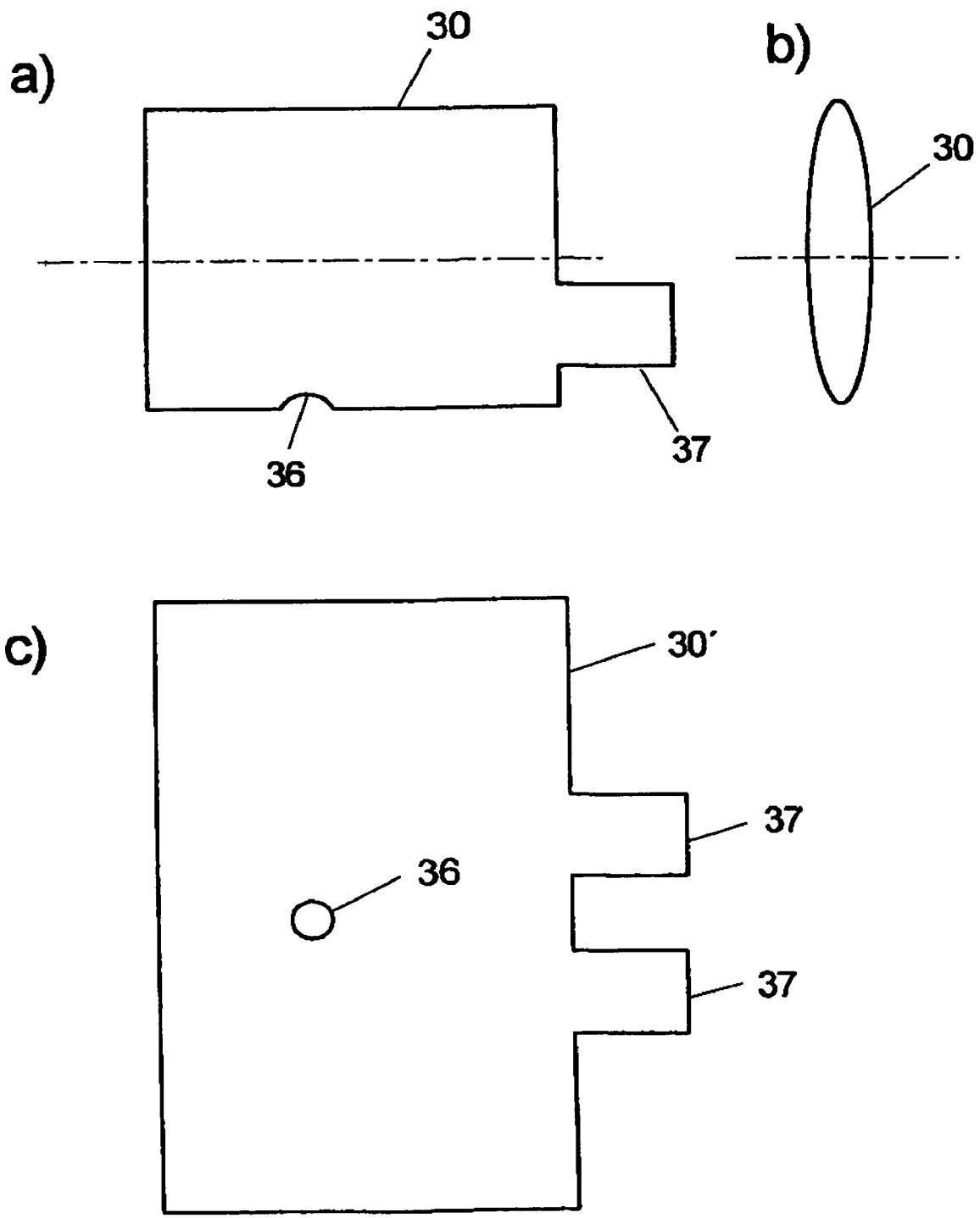
FIGS. 6a and 6b are side and front views of a gas flow distributor according to an exemplary embodiment.
FIG. 6c is a schematic view of a blank for a gas flow distributor according to an exemplary embodiment.

FIGS. 5 and 6 show a third embodiment of the gas flow distributor. FIG. 5 shows a gas flow distributor 30 that is connected to a gas generator 1. The gas generator 1 is designed analogously to FIGS. 1 and 3 as a tubular gas generator and includes a fastening rail 3. The fastening rail 3 is connected to the gas generator 1 via clamping rings 5. In this embodiment, the fastening rail 3 has threaded bolts 4.

In an alternative embodiment, the gas flow distributor 30 includes an opening 36 and fastening tabs 37. The gas flow distributor 30 of FIG. 5 combines an opening 36, through which a threaded bolt 4 extends, and fastening tabs 37 via which the gas flow distributor 30 is clamps to the gas generator 1. In this embodiment, the clamping of the gas flow distributor 30 takes place via the clamping rings 5 which completely engage around the gas generator 1 and fix the fastening rail 3 and the fastening tabs 37 to the gas generator 1.

In an embodiment of FIGS. 1 and 3 the gas flow distributor 30 can be compressed at the end which faces away from the gas generator 1 to be arranged in as space-saving a manner as possible. The gas flow distributor 30 may be compressed continuously, i.e. may have an oval cross section over the entire length arranged at a distance from the outflow openings.

FIG. 5 shows an exemplary embodiment similar to the embodiments of FIGS. 1 and 3. The gas flow distributor 30 enables a gas flow from the gas generator 1 to be divided in two directions, A and B. The gas flow emerging from the gas generator 1 can then be distributed in a specific manner into an airbag.

FIG. 6a schematically illustrates a side view of a gas flow distributor 30 that includes an opening 36 for receiving a threaded bolt and fastening tabs 37 for clamping to a gas generator (not illustrated). The gas flow distributor 30 may be constructed of a flexible material. Therefore an elliptical cross section, as shown in FIG. 6b, may be produced by compression. In this embodiment, the elliptical cross-sectional surface may extend over the entire length of the gas flow distributor 30. In another embodiment, only one end of the gas flow distributor 30 may have an elliptical cross section while the opposite end may be shaped such that it is virtually hollow-cylindrical in order to permit a better connection.

FIG. 6c schematically shows an illustration of the gas flow distributor 30 shown in FIGS. 6a and 6b. The gas flow distributor 30 may be produced from a blank 30' which has an opening 36 and two fastening tabs 37 for connection of the gas flow distributor 30 to a gas generator 1.

FIG. 7a shows an exemplary embodiment of the gas flow distributor. In this embodiment, a gas flow distributor 40 may be formed from planar material. The gas flow distributor 40 may include a plurality of layers of the planar material in some sections. The gas flow distributor 40 includes openings 46 and a fastening tab 47 as fastening structures for connection to a gas generator. An opening 46b is arranged here in the region of the fastening tab 47 such that the latter can be fastened to a gas generator via a threaded bolt and by a clamping ring.

In an exemplary embodiment according to FIG. 7a a plurality of material layers may be arranged in the region of the opening 46a and of the fastening tab 47. A stable connection of the gas flow distributor 40 to a gas generator (not illustrated) may be possible by arranging a plurality of material layers such that tearing out of the openings 46a, 46b is limited.

FIG. 7b shows a blank 40' of a planar material from which the gas flow distributor 40 of FIG. 7a may be formed. The blank 40' includes openings 46a' and 46b' that are aligned with each other after production of the gas flow distributor 40 by coiling up of the blank 40'. Additionally, the blank 40' includes tab-shaped sections 47 that lie one above another in the finished gas flow distributor, forming a tear-resistant fastening tab 47 for the connection of the gas flow distributor to a gas generator.

Figure 8:
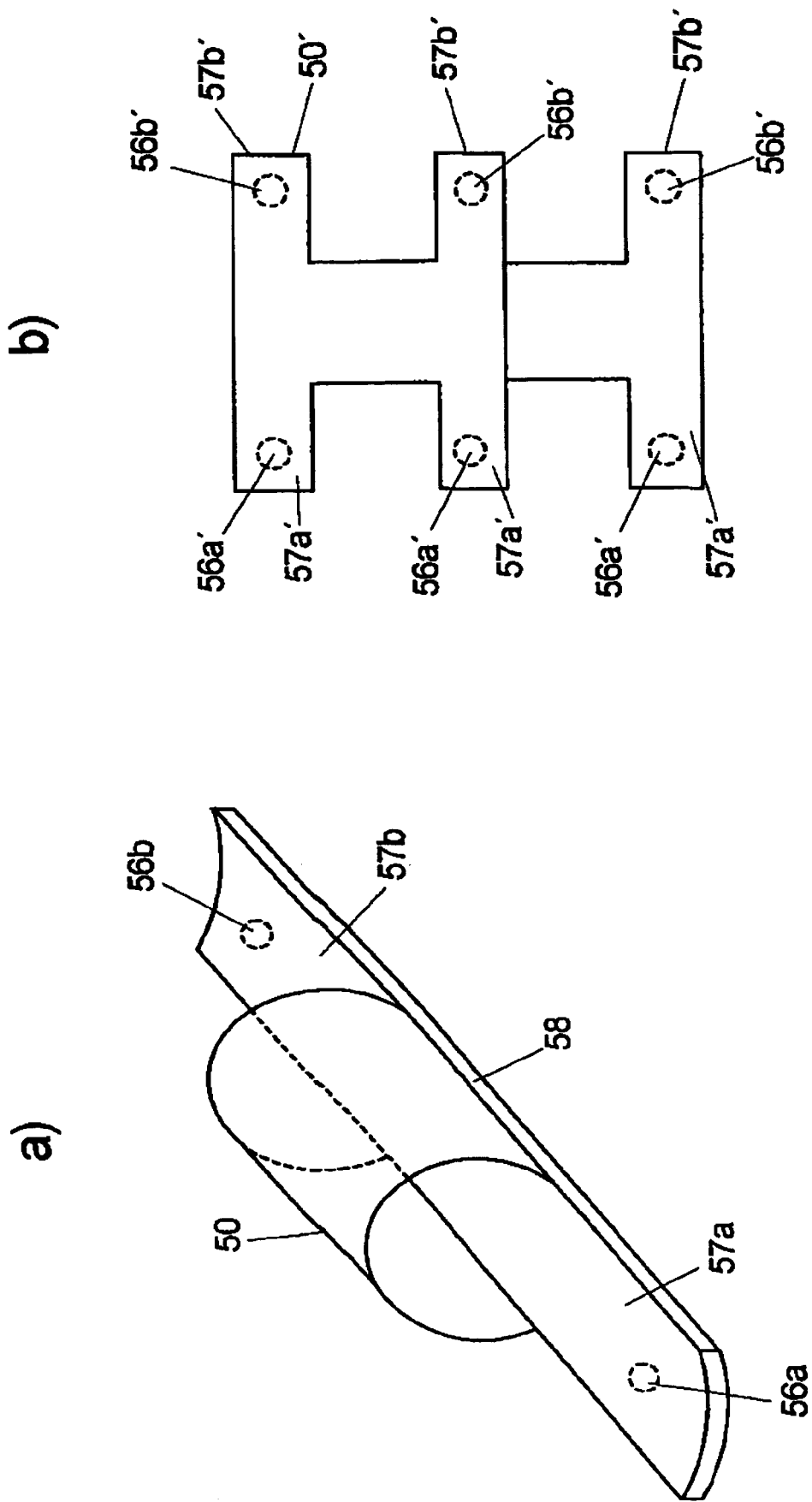

FIG. 8a shows an exemplary embodiment of the gas flow distributor. The fastening structures are formed from a multi-layered material similar to FIG. 7a. However, in contrast to the gas flow distributor of FIG. 7a, the gas flow distributor 50 of FIG. 8a includes two fastening tabs 57a and 57b that are arranged at opposite ends of the gas flow distributor 50. The two fastening tabs 57a and b each have an opening 56a, b through which a threaded bolt of a gas generator can be guided. This design of the gas flow distributor 50 permits the gas flow distributor 50 to be arranged centrally on a gas generator that includes centrally arranged outflow openings.

Shown in FIG. 8a, the fastening tabs 57a, b are of multi-layered design, increasing their tear resistance. A section 58 of the gas flow distributor 50 that can be arranged opposite outflow openings of a gas generator is also of multi-layered design. The multi-layered structure may be arranged in the region of outflow openings of the gas generator, limiting the gas flow distributor from being destroyed by gas flow from an outflow opening.

Shown in FIG. 8b the gas flow distributor 50 of FIG. 8a may be formed from a blank 50' of planar material. In this embodiment, the blank 50' has tab-like extensions 57a' and 57b' that lie one above the other and form the fastening tabs 57a and 57b. Furthermore, openings 56a' and 56b' are arranged in the tab-shaped extensions 57a' and 57b'. The openings are aligned with each other in the finished gas flow distributor and form the fastening openings 56a and 56b, respectively, of FIG. 8a.

The blank 50' illustrated results in a gas flow distributor. The hollow-cylindrical region of the blank 50' is of two-layered design and the fastening tabs are of three-layered design. The blank can also be produced in such a manner that only the fastening tabs of the gas flow distributor formed from the blank are multi-layered. In this embodiment, the blank of FIG. 8b would be reduced in size in such a manner that, on two sides of the blank, there are only two fastening tabs that lie one above the other after the blank has been coiled up once.

Figure 9:
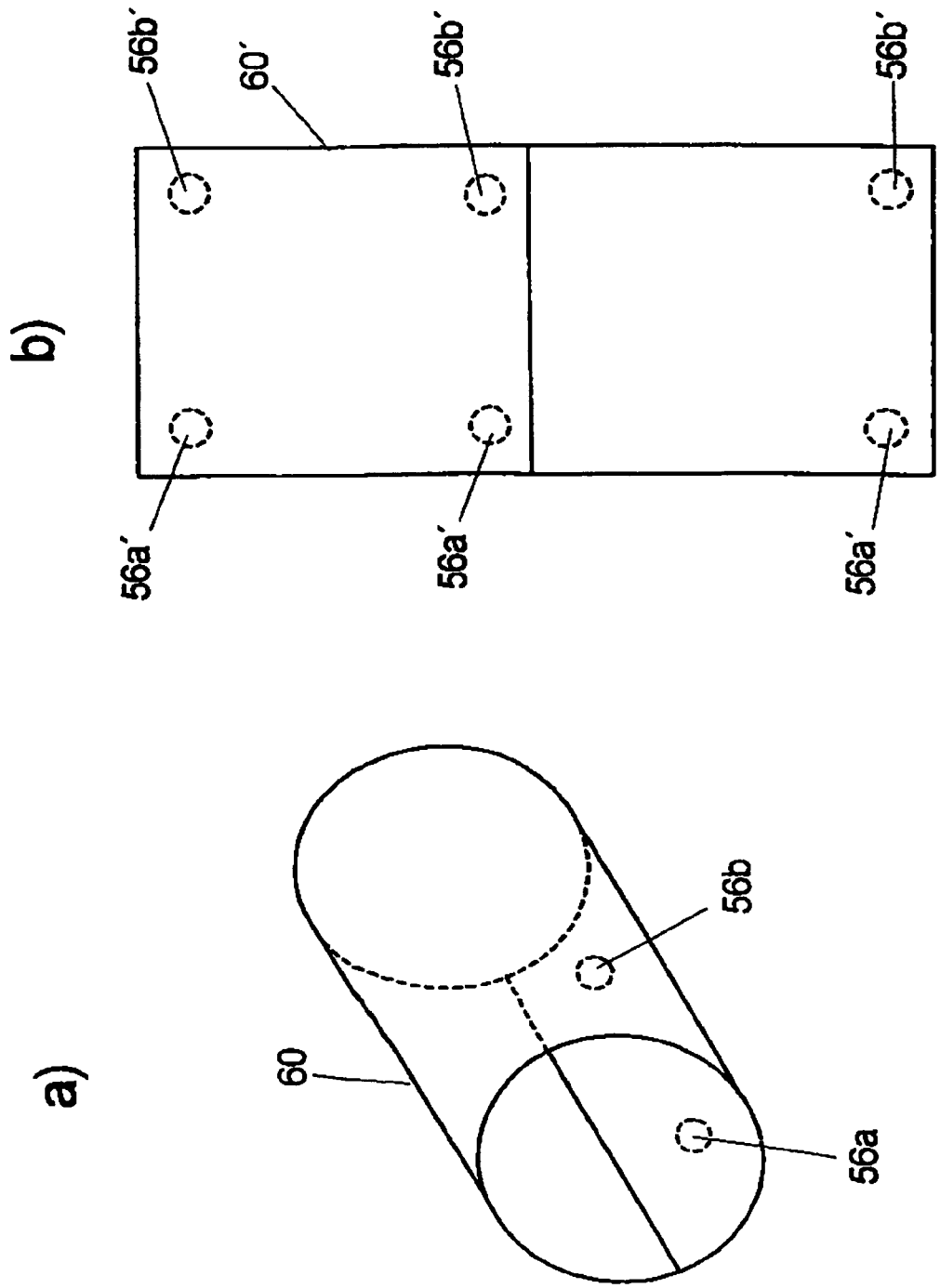

Shown in FIG. 9a is an exemplary embodiment of the gas flow distributor. The gas flow distributor 60 illustrated has openings 56a and 56b that fasten the gas flow distributor 60 to a gas generator (not illustrated). In this embodiment, the gas flow distributor 60 is formed from a planar material that may be of multi-layered construction in the region of the fastening opening 56. The gas flow distributor 60 may be such a length that the gas flow distributor extends both over outflow openings arranged centrally and also outflow openings arranged in the starting and end regions of the gas generator. The multi-layered region of the gas flow distributor 60 is arranged in the region of the outflow openings such that damage to the gas flow distributor by out flowing gases is limited.

FIG. 9b schematically shows a blank 60' from which the gas flow distributor 60 of FIG. 9a may be produced. In this embodiment, the blank 60' consists of a flexible material including openings 56a' and 56b'. The openings are aligned with each other during production by coiling up the blank 60', forming the fastening openings 56a and 56b of FIG. 9a.

A blank that is coiled numerous times may be used for the production of a gas flow distributor. This allows for the production of a gas flow distributor reinforced by a plurality of multi-layered material, therefore having a more stable structure.

FIGS. 10 and 11 show an exemplary embodiment of the gas flow distributor. FIG. 10a shows a gas flow distributor 70 made of planar material. In the center of the gas flow distributor 70 a fastening opening 76 is arranged. The fastening opening 76 can be connected to threaded bolts arranged on a gas generator (not illustrated). The two ends of the gas flow distributor 70 each have two fastening tabs 77a, 77b and 78a, 78b, with the free ends of the fastening tabs 77a, 77b of one end of the gas flow distributor 70 being connected to each other.

The connection of the fastening tabs 77a and 77b controls the gas flow through the gas flow distributor 70. The connection of the two opposite fastening tabs 77a, 77b divides the gas flow conducted from the gas flow distributor 70 in the direction of the end of the gas flow distributor 70 that includes the fastening tabs 77a, 77b. It is also possible for additional fastening tabs to be arranged on one or both ends of the gas flow distributor 70 next to the two fastening tabs 77a, 77b. In this embodiment, the emergence of the gas flow on one side of the gas flow distributor 70 is greatly reduced or prevented.

The fastening tabs 77a, 77b and 78a, 78b may be of single-layered or multi-layered design. The gas flow distributor 70 may also be of single-layered design, but may also include a plurality of material layers. For example, sections may be arranged in the region of the outflow opening of the gas generator in order to be more resistant to the gas flow from the outflow openings.

FIG. 10b shows a blank for a gas flow distributor according to FIG. 10a. In this embodiment, the tab 70' is designed such that one fastening tab 77a or 78a is multi-layered while the tab 77b or 77a lying opposite said tab is single-layered. Furthermore, the blank 70' includes openings 76' which are aligned, forming the fastening opening 76.

The blank for producing the gas flow distributor may also be designed such that both fastening tabs at one end of the gas flow distributor are either multi-layered or single-layered.

FIG. 11a shows an example of two multi-layered fastening tabs. A gas flow distributor 80 includes two fastening tabs 88a, 88b at one end. Each fastening tab is of multi-layered construction. In addition, an opening 86 is arranged in the gas flow distributor 80 for fastening to a threaded bolt of a gas generator.

FIG. 11b shows a blank 80' from which the gas flow distributor of FIG. 11a may be produced by repeated coiling. In this embodiment, the blank 80' includes openings 86' that, during the coiling of the blank 80' to form a gas flow distributor, are aligned with one another forming the fastening opening 86 of FIG. 11a. This region of the gas flow distributor therefore includes three material layers. The side of the blank 80' lying opposite the openings 86a' includes a total of five tab-like extensions 88a', 88b'. Three extensions 88a' and two extensions 88b' lie one above another in the finished gas flow distributor and form a fastening tab 88a that is reinforced three times and a fastening tab 88b that is reinforced twice.

Figure 12E:
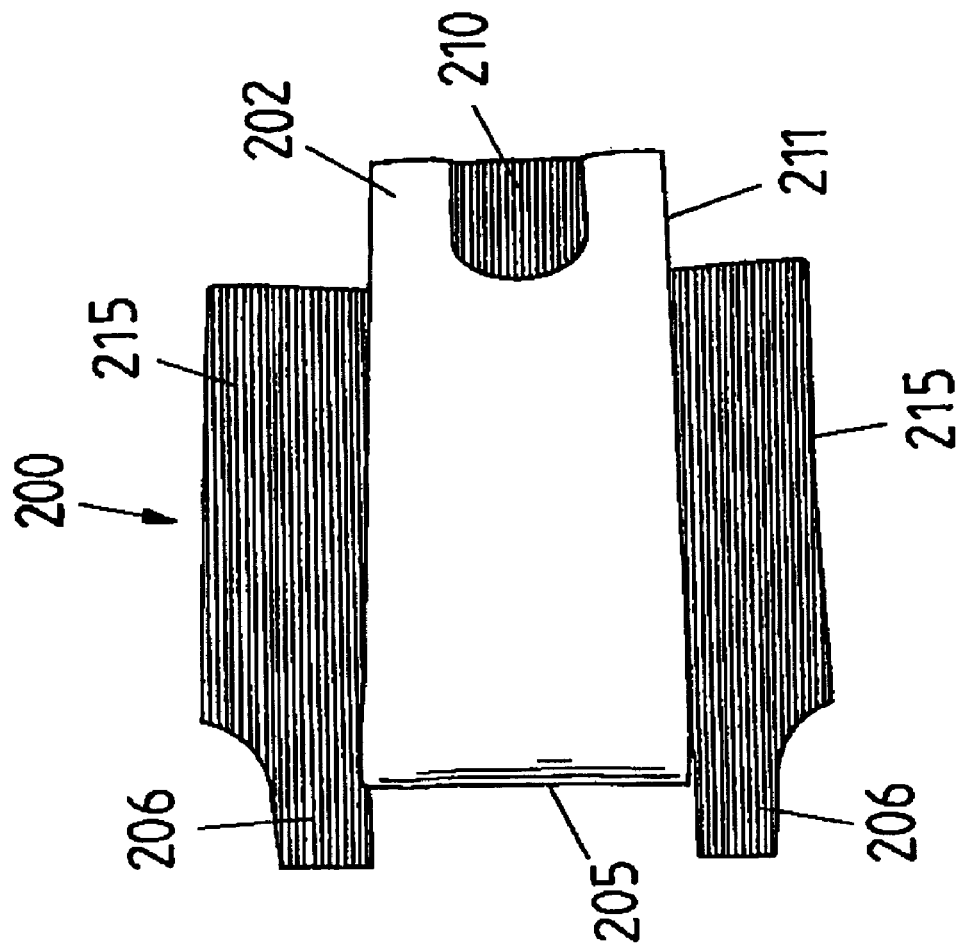
FIG. 12e shows a folding from the uncoiled state of FIGS. 12c, 12d.

FIGS. 12a to 12e show an exemplary embodiment of the gas flow distributor. FIG. 12a shows a gas flow distributor 200, that includes a fastening tab 202 at one end, from above. In an embodiment, a gas generator (not illustrated) assigned to the gas flow distributor would extend below the fastening tab 202 into the gas flow distributor 200. In order to fasten the gas flow distributor 200 to a gas generator, the fastening tab 202 may be connected to the gas generator, for example via a clamping ring. The construction of the gas flow distributor is explained in more detail with reference to the illustrations of FIGS. 12c-12e.

The gas flow distributor 200 includes, on the fastening tab 202, an outflow region 207 in which a coating 210 can be seen. Opposite the fastening tab 202 is an outflow opening 205 and flow tabs 206 that guide a gas flow emerging from the outflow opening 205. The outflow opening 205 is illustrated in the rear view of the gas flow distributor 200 according to FIG. 12b.

FIG. 12c shows the interior of the uncoiled gas flow distributor 200 of FIGS. 12a and 12b. The inside of the gas flow distributor may include a coating 210 (illustrated by shading). In order to produce the gas flow distributor 200, a section 211 and two side tabs 215 are folded over onto the rest of the gas flow distributor 200. The section 211 of the gas flow distributor 200 may include an additional material layer 212 that covers the coating 210 in this region. The additional material layer 212 may be formed with the rest of the gas flow distributor. The material layer 212 may be produced by folding over a section of the material layer that forms the gas flow distributor.

FIG. 12d shows the outside of the gas flow distributor 200 in the uncoiled state. In the region section 211, the gas flow distributor 200 includes a cutout 207, making the coating 210 visible. The cutout 207 forms a gas outflow region.

FIG. 12e shows a step during the production of the gas flow distributor 200. The section 211 (cf. FIG. 12c) is folded over onto the remaining region of the gas flow distributor such that it partially protrudes over the edge of the gas flow distributor. The protruding region of the section 211 forms the fastening tab 202.

In a further step during production of the gas flow distributor 200, the side tabs 215 are folded onto the section 211. Therefore, the finished gas flow distributor 200 constitutes a hollow body. A gas generator may be introduced into the gas flow distributor 200 at the end that includes the fastening tab 202. The gas flow distributor may be fastened to the gas generator by means of the fastening tab 202.

It should be mentioned that the fastening tabs of the above exemplary embodiments are formed as extensions that protrude from the rest of a gas flow distributor. Furthermore, it is also possible to provide fastening tabs that are not designed as a protruding extension but rather are formed by cutting into or cutting up an end region of a gas flow distributor. In this embodiment, the fastening tabs end at that end of the gas flow distributor on which they are formed. A gas generator may be clamped to such fastening tabs by a clamping ring.

In an exemplary embodiment, an opening may be provided opposite the fastening tab. As a result, clamping rings that a threaded bolt is arranged on may be used for clamping a gas flow distributor to the fastening tab. In this embodiment, a gas flow distributor may be fastened to a gas generator by clamping to the fastening tab and via the threaded bolt guided through the opening opposite the fastening tab.

FIGS. 13a to 13d show exemplary embodiments of a gas flow distributor formed from a tubular material rather than a planar material. In this embodiment, the production of the gas flow distributor may take place by cutting up the tubular material.

Figure 13:
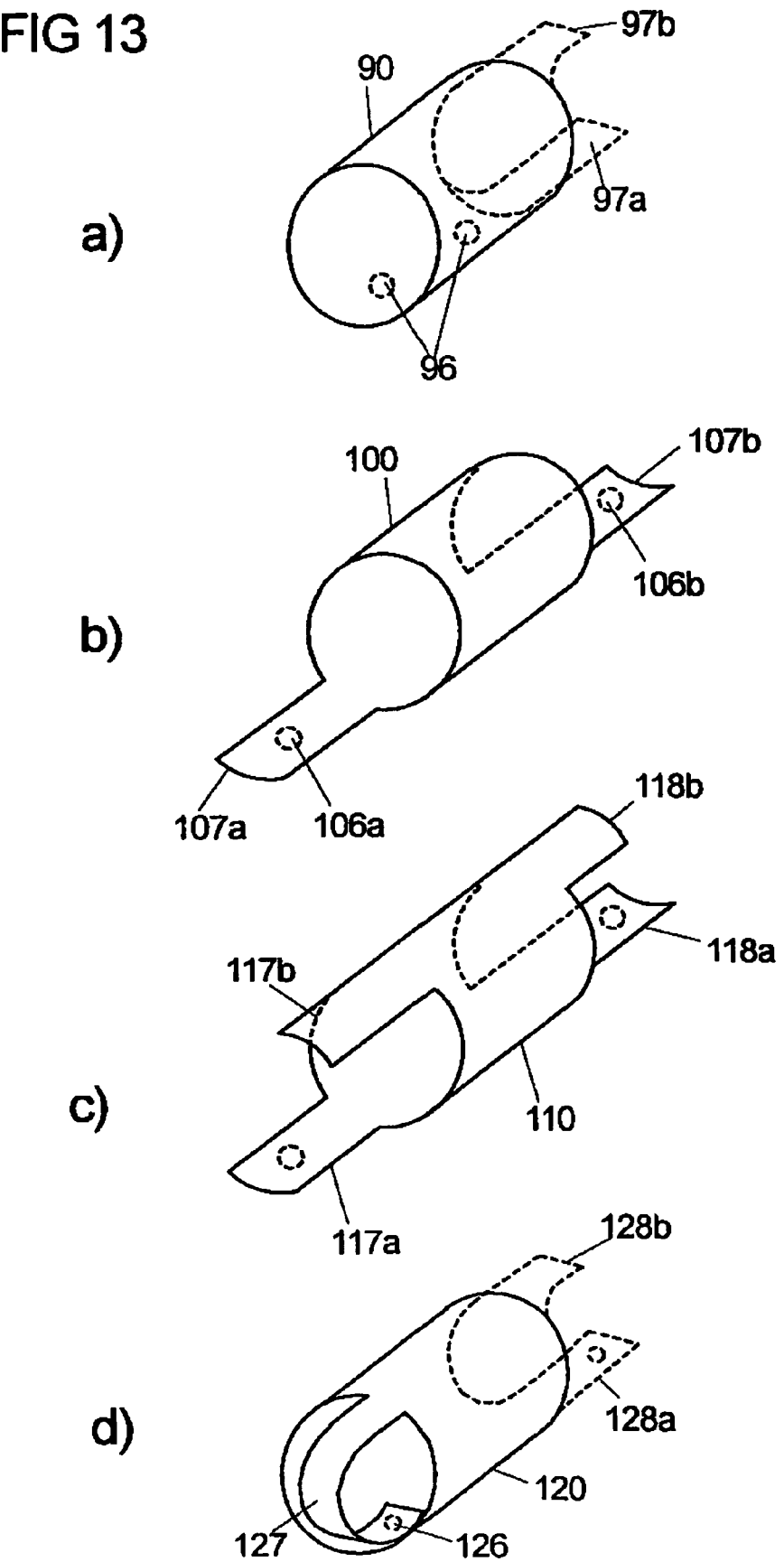
FIGS. 13a-13d show various exemplary embodiments of a gas flow distributor formed from a tubular material.

FIG. 13a shows a gas flow distributor 90 with fastening openings 96 and fastening tabs 98a, 98b. This embodiment of the gas flow distributor 90 comprises geometry similar to the exemplary embodiment of FIG. 11a.

FIG. 13b shows a further exemplary embodiment. In this embodiment, a gas flow distributor 100 includes a fastening tab 107a with a fastening opening 106a and a fastening tab 107b with a fastening opening 106b. This embodiment is of similar geometry to the gas flow distributor shown in FIG. 8a.

According to FIG. 13c, a gas flow distributor 110 includes fastening tabs 117a, 117b and 118a, 118b that may also be connected to each other, as shown for the planar material in FIG. 10a.

FIG. 13d shows a further embodiment of a gas flow distributor formed from a tubular material. A gas flow distributor 120 includes, at one end, a fastening tab 127. The free end of the fastening tab 127 is bent over. Opposite the fixed end, the fastening tab 127 may be connected to the gas flow distributor 120. Both the gas flow distributor 120 and the free end of the fastening tab 127 include openings that, during the fastening of the free end of the fastening tab 127 to the gas flow distributor 120, are aligned with each other forming a fastening opening 126. Furthermore, the gas flow distributor 120 includes, on the second end side, fastening tabs 128a and 128b for connection of the gas flow distributor 120 to a gas generator.

The priority application, Germany Patent Application No. 20 2005 019 013.6, filed Dec. 1, 2005 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. A gas flow distributor arrangement for an airbag module distributing a gas flow generated by a gas generator to inflate an airbag, comprising:

a gas flow distributor comprising fastening structures for fastening the gas flow distributor to the gas generator, the gas flow distributor being formed in a shape of a sleeve from a flexible material, wherein the fastening structures comprise at least one fastening tab via which the gas flow distributor is fastened to the gas generator, wherein the gas flow distributor comprises a tubular portion, wherein the at least one fastening tab comprises a first end portion, a second end portion arranged opposite to the first end portion in a direction along a longitudinal axis of the tubular portion, and opposing edges forming a width of the fastening tab that extends from the first end portion to the second end portion, the width of the fastening tab being less than a circumferential distance around the tubular portion, wherein the first end portion is integrally connected to the tubular portion such that the at least one fastening tab protrudes out and away from the tubular portion in the direction along the longitudinal axis of the tubular portion, and wherein the gas flow distributor is configured and fastened to the gas generator in such a way that the gas flow distributor divides the gas flow into a plurality of partial flows and conducts the plurality of partial flows away in different directions while remaining fastened.

2. The gas flow distributor arrangement as claimed in claim 1, wherein the fastening structures comprise at least one opening for passage of a threaded bolt arranged on the gas generator.

3. The gas flow distributor arrangement as claimed in claim 1, wherein the at least one fastening tab comprises two fastening tabs, each fastening tab being arranged at each of two ends of the gas flow distributor.

4. The gas flow distributor arrangement as claimed in claim 1, wherein free ends of the gas flow distributor each have at least one outflow opening.

5. The gas flow distributor arrangement as claimed in claim 1, wherein the gas flow distributor is configured to distribute the gas flow in two directions and is arranged on the gas generator.

6. The gas flow distributor arrangement as claimed in claim 1, wherein the gas flow distributor is at least formed in sections from a textile fabric.

7. The gas flow distributor arrangement as claimed in claim 1, wherein the gas flow distributor is formed from a plurality of layers of a textile fabric at least in sections.

8. The gas flow distributor arrangement as claimed in claim 1, wherein the gas flow distributor can be produced from a blank of textile fabric.

9. The gas flow distributor arrangement as claimed in claim 1, wherein the gas flow distributor is formed from a tubular material.

10. The gas flow distributor arrangement as claimed in claim 1, wherein a coating is applied to at least sections on an inside of the gas flow distributor.

11. The gas flow distributor arrangement as claimed in claim 1, wherein the gas flow distributor is configured to divide the gas flow to flow in two substantially opposite directions.

12. The gas flow distributor arrangement as claimed in claim 1, wherein the at least one fastening tab is clamped to the gas generator by a clamping ring.

13. The gas flow distributor arrangement as claimed in claim 1, wherein the at least one fastening tab comprises at least two fastening tabs arranged at a same end of the gas flow distributor.

14. The gas flow distributor arrangement as claimed in claim 13, wherein free ends of the at least two fastening tabs are connected to each other.

15. A gas flow distributor arrangement for an airbag module distributing a gas flow generated by a gas generator to inflate an airbag, comprising:

a gas flow distributor comprising fastening structures for fastening the gas flow distributor to the gas generator, the gas flow distributor being formed in a shape of a sleeve from a flexible material, wherein the fastening structures comprise at least one fastening tab via which the gas flow distributor is fastened to the gas generator, wherein the gas flow distributor comprises a tubular portion, and the at least one fastening tab comprises a first end portion and a second end portion that are arranged opposite to one another in a direction along a longitudinal axis of the tubular portion, wherein the first end portion is integrally connected to a front face of the tubular portion such that the at least one fastening tab protrudes out and away from the front face of the tubular portion in the direction along the longitudinal axis of the tubular portion, wherein the second end portion is located a distance away from the tubular portion, and wherein the gas flow distributor is configured and fastened to the gas generator in such a way that the gas flow distributor divides the gas flow into a plurality of partial flows and conducts the plurality of partial flows away in different directions while remaining fastened, wherein the fastening structures are configured in such a manner that a clamping connection to the gas generator can be produced without a clamp engaging around an entire circumference of the gas flow distributor.

16. An airbag module for a vehicle restraint system, comprising:

an airbag;

a gas generator; and a gas flow distributor for the airbag module distributing a gas flow generated by the gas generator to inflate the airbag;

wherein the gas flow distributor includes fastening structures for fastening the gas flow distributor to the gas generator, the gas flow distributor being formed in a shape of a sleeve from a flexible material, wherein the fastening structures comprise at least one fastening tab that is formed at one end of the gas flow distributor and via which the gas flow distributor is fastened to the gas generator, wherein the gas flow distributor surrounds the gas generator in at least a region of the gas generator comprising outflow openings, wherein the at least one fastening tab extends in a longitudinal direction of the gas flow distributor, wherein an end region of the gas flow distributor comprises cuts, the at least one fastening tab is formed by the cuts arranged in the end region of the gas flow distributor so that the at least one fastening tab ends at that end of the gas flow distributor on which the at least one fastening tab is formed, wherein the gas flow distributor is clamped via the at least one fastening tab to the gas generator by a clamping ring, and wherein the gas flow distributor is configured and fastened to the gas generator in such a way that the gas flow distributor divides the gas flow into a plurality of partial flows and conducts the plurality of partial flows away in different directions while remaining fastened.

17. The airbag module as claimed in claim 16, wherein the gas flow distributor is fastened by the fastening structures to the gas generator.

18. The airbag module as claimed in claim 16, wherein at least one threaded bolt is arranged on the gas generator and extends through an opening in the gas flow distributor, the gas flow distributor being fastened to the gas generator during installation of the airbag module to an airbag or a vehicle seat.

19. The airbag module as claimed in claim 16, wherein the at least one fastening tab is used to fasten the gas flow distributor to the gas generator.

20. The airbag module as claimed in claim 16, wherein the gas flow distributor is formed from a textile fabric and arranged at the gas generator in such a manner that a plurality of fabric layers are arranged in a region of at least some of the outflow openings of the gas generator.

21. The airbag module as claimed in claim 16, wherein the at least one fastening tab comprises at least two fastening tabs arranged at a same end of the gas flow distributor, wherein free ends of the at least two fastening tabs are connected to each other.

22. The airbag module as claimed in claim 16, wherein the gas flow distributor is arranged on the gas generator in such a manner that the gas flow out of the outflow openings of the gas generator is divided into two substantially opposite directions.

23. The airbag module as claimed in claim 16, wherein the gas flow distributor is arranged at a distance from the gas generator in at least a region of the outflow openings of the gas generator.

24. An airbag module for a vehicle restraint system, comprising:
an airbag;
a gas generator; and
a gas flow distributor for the airbag module distributing a gas flow generated by the gas generator to inflate the airbag;
wherein the gas flow distributor includes fastening structures for fastening the gas flow distributor to the gas generator, the gas flow distributor being formed in a shape of a sleeve from a flexible material,
wherein the fastening structures comprise at least one fastening tab that is formed at one end of the gas flow distributor and via which the gas flow distributor can be fastened to the gas generator,
wherein the gas flow distributor surrounds the gas generator in at least a region of the gas generator comprising outflow openings,
wherein the at least one fastening tab extends in a longitudinal direction of the gas flow distributor,
wherein an end region of the gas flow distributor comprises cuts, the at least one fastening tab is formed by the cuts arranged in the end region of the gas flow distributor so that the at least one fastening tab ends at that end of the gas flow distributor on which it is formed,
wherein the gas flow distributor is clamped via the at least one fastening tab to the gas generator by a clamping ring, and
wherein at least one threaded bolt is arranged on the gas generator and extends through an opening in the gas flow distributor, the gas flow distributor being fastened to the gas generator by a nut on the threaded bolt.

* * * * *